United States Patent
Lygren

(10) Patent No.: US 9,500,942 B2
(45) Date of Patent: Nov. 22, 2016

(54) SCREEN

(71) Applicant: Momentor ANS, Oslo (NO)

(72) Inventor: Jon-Eivind Lygren, Oslo (NO)

(73) Assignee: MOMENTOR ANS (NO)

( * ) Notice: Subject to any disclaimer, the term of this patent is extended or adjusted under 35 U.S.C. 154(b) by 0 days.

(21) Appl. No.: 14/785,630

(22) PCT Filed: Apr. 15, 2014

(86) PCT No.: PCT/NO2014/050060
§ 371 (c)(1),
(2) Date: Oct. 19, 2015

(87) PCT Pub. No.: WO2014/175747
PCT Pub. Date: Oct. 30, 2014

(65) Prior Publication Data
US 2016/0077421 A1    Mar. 17, 2016

(51) Int. Cl.
*G03B 21/56* (2006.01)
*G03B 21/60* (2014.01)

(52) U.S. Cl.
CPC ............ *G03B 21/565* (2013.01); *G03B 21/60* (2013.01)

(58) Field of Classification Search
CPC ..... G03B 21/56; G03B 21/565; G03B 21/60
USPC .................................. 359/445, 449
See application file for complete search history.

(56) References Cited

U.S. PATENT DOCUMENTS

| | | | | |
|---|---|---|---|---|
| 1,959,434 A * | 5/1934 | Major | .................. | G03B 21/565 245/1 |
| 1,995,964 A * | 3/1935 | Darimont | ............. | G03B 21/606 359/455 |
| 3,692,384 A * | 9/1972 | Kimura | .................. | G03B 21/56 359/445 |
| 5,140,460 A * | 8/1992 | Fukuhara | ............. | G03B 21/565 359/445 |
| 7,349,154 B2 * | 3/2008 | Aiura | ..................... | G03B 21/56 359/449 |
| 7,777,947 B2 * | 8/2010 | Congard | ............... | G03B 21/56 359/445 |
| 8,164,830 B2 * | 4/2012 | Astill | ..................... | G03B 21/58 160/241 |
| 2002/0051289 A1 | 5/2002 | Congard | | |
| 2006/0187544 A1* | 8/2006 | Wiener | .................. | G03B 21/58 359/443 |
| 2008/0211972 A1 | 9/2008 | Congard et al. | | |

FOREIGN PATENT DOCUMENTS

| | | |
|---|---|---|
| BE | 434831 A | 7/1939 |
| GB | 607875 A | 9/1948 |
| GB | 679778 A | 9/1952 |
| JP | H11-38508 | 2/1999 |
| JP | 2000010193 A | 1/2000 |

OTHER PUBLICATIONS

English language Abstract of JP 2000010193 A.
English language Abstract of JPH 11-38508.
International Search Report mailed on Jul. 14, 2014.
Written Opinion of the International Preliminary Examining Authority mailed on Jul. 17, 2015.
International Preliminary Report on Patentability mailed on Sep. 16, 2015.

* cited by examiner

*Primary Examiner* — Christopher Mahoney
(74) *Attorney, Agent, or Firm* — Hershkovitz & Associates, PLLC; Abe Hershkovitz

(57) ABSTRACT

A projection screen that allows sound to pass through the screen while video is reflected is provided.
This screen is provided using a first non-perforated reflecting screen of a first density, and at least one perforated reflecting screen of a second density, wherein the first density is greater than the second density.

18 Claims, 1 Drawing Sheet

SCREEN

BACKGROUND OF THE INVENTION

1. Technical Field

The invention relates to screens in general and more specifically a projection screen that allows sound to pass through the screen while video is reflected.

2. Background Art

From prior art one should refer to screens comprising a single perforated reflective front layer admitting some sound to pass through, optionally attached to a non-reflective backing layer. Loudspeakers are positioned behind the screen and the perforations admit sounds through the screen, reaching the audience. Such solutions are provided by Screen Excellence and Screen Research.

Some screen technologies use multiple layers. However these have a single reflecting layer and are designed to provide improved contrast, not density.

Density in this context refers to the structure of the fabric. High density means that the structure is finer. As for area mass, typically described in units of $g/m^2$, it refers to the weight of the fabric. In most cases, lower weight correlates with higher density as the thread is thinner and thus the weave/knitting finer.

One should also refer to other methods for achieving sound-transparency for projection-screens. Traditionally, regular vinyl fabric was perforated with small holes to allow the sound to pass through. This technique is still used for most large cinema screens. For home theatre usage, the perforation-technology is not sufficiently good, as the holes would be too visible at short viewing-distances. Thus, various companies have utilized weaved or knitted fabric instead. This would still allow sound to pass through, meanwhile reducing the visible structure/holes in the fabric allowing for closer seating-distance.

From prior art one should refer to BE434831 regarding a sound transparent multilayer screen. However layers behind the front screen are disclosed as being diffuse, resulting in lack of sharpness.

One should also refer to JPH 11-38508 regarding a two layer light weight screen.

Finally one should refer to GB607875 regarding multi-layer screens wherein some layers are dark, the purpose being to create illusions of depth.

BRIEF DESCRIPTION OF THE INVENTION

Problems to be Solved by the Invention

The problem with these systems is that the structure of the holes or texture of the screen interferes with the higher resolution pixels available in modern screen projection technology. This causes a problem referred to as "screen moiré", whereas the pixels from the projector is aligned with the structure of the fabric. Screen moiré can be avoided by using higher density/resolution in the fabric.

Also, in home theatre setups where the audience is seated close to the screen, the actual structure from the fabric may become visible if the fabric is not of sufficient density/resolution. This would reduce the image-quality.

Therefore, a main objective of the present invention is to provide a screen that admits sound to the audience while providing a screen that reflects high resolution pixels.

Means for Solving the Problems

The objective is achieved according to the invention by a screen as defined in the preamble of claim 1, having the features of the characterising portion of claim 1.

The present invention attains the above-described objective by a plurality of bonded reflecting screens having different densities, wherein the front reflecting screen has a high density and the second screen has a low density. High density in this context means having a structure finer than the structure from the projected pixel grids.

Effects of the Invention

The technical differences over prior art is that a thin high density front layer will provide a good reflection of high resolution pixels, while successive layers of thick back layers to improve reflection.

To maintain sharpness the front reflecting screen and the second reflecting screen should be kept close together to avoid loss of contrast.

These effects provide in turn several further advantageous effects:

- it makes it possible to avoid the problems of creating a randomized structure of perforations to avoid interference with high resolution pixels since the front reflecting screen has such high density that "moiré" no longer would be an issue as the structure in which the front reflecting screen is made no longer is able to converge with the structure from the projected pixels-grid,
- it makes it possible to avoid using a black backing screen,
- it reduces the density while increasing the resolution significantly, reducing visible structure, and
- allows utilizing different materials in the various layers that would not have worked by itself, i.e. a finely, very thin, high density woven front layer, and a thicker, lower density, but more sound-transparent knitted back layer

BRIEF DESCRIPTION OF THE DRAWINGS

The above and further features of the invention are set forth with particularity in the appended claims and together with advantages thereof will become clearer from consideration of the following detailed description of an [exemplary] embodiment of the invention given with reference to the accompanying drawings.

The invention will be further described below in connection with exemplary embodiments which are schematically shown in the drawings, wherein.

DESCRIPTION OF THE REFERENCE SIGNS

Figure 1:
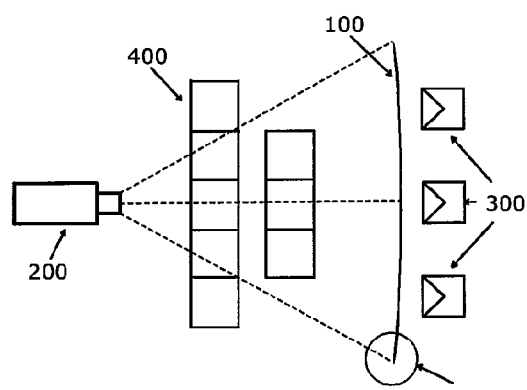
FIG. 1 shows an overview of a typical embodiment of a projection system comprising a screen and loudspeakers with an indicator for detail view

The following reference numbers and signs refer to the drawings:

| | |
|---|---|
| 100 | Screen |
| 105 | Perforated front reflecting screen |
| 110 | Front reflecting screen |
| 120 | Second reflecting screen |
| 130 | Third reflecting screen |
| 150 | Backing screen |

| | |
|---|---|
| 200 | Projector |
| 210 | Light beam from projector |
| 220 | Reflected beam from the front reflecting screen |
| 230 | Reflected beam from the second reflecting screen |
| 240 | Reflected beam from the third reflecting screen |
| 300 | Loudspeakers |
| 400 | Audience |

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The invention will be further described in connection with exemplary embodiments which are schematically shown in the drawings, wherein:

FIG. 1 shows a separated view of a typical embodiment of a projection system comprising a screen 100 in relationship to a projector 200 and an audience 400 on a first side of the screen and loudspeakers 300 on the second side of the screen. A circle indicates details of the screen wherein the differences between prior art and the present invention will become apparent.

Figure 2A:
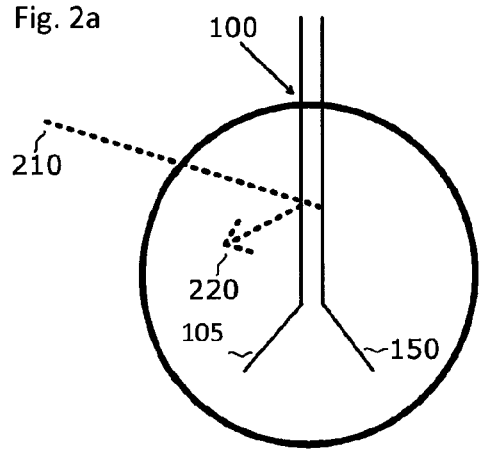
FIG. 2a shows a separated detail view of a typical embodiment of a screen according to prior art.

FIG. 2a shows a separated detail view of a typical embodiment of a screen according to prior art. The screen 100 comprises a front screen, preferably a perforated front screen 105 attached to a non-reflecting, typically light absorbing, preferably black, backing screen 150. The reflection 220 of the projected image by light beam 220 from the projector 200 to the audience 400 takes place on the front screen. The backing screen 150 is used to absorb stray light to avoid loss of contrast. In order to admit sound from the loudspeakers 300 to the audience the backing screen must have an open structure. Such open structure can be achieved by weaving or knitting.

The figure shows a single light beam for illustration purposes. In typical operations a plurality of light beams will be emitted from the projector.

The front screen and the backing layer are typically bonded together.

Principles Forming the Basis of the Invention

A screen can be sound transparent by virtue of thinness or being perforated. Perforations arise from the weaving process. If the openings formed are on a similar scale as pixels, optical artefacts (moiré) will be visible. The present invention combines a thin non-perforated front screen with thicker woven reflecting backing screens. A thin screen alone would not provide sufficient light-reflection.

BEST MODES OF CARRYING OUT THE INVENTION

Figure 2B:
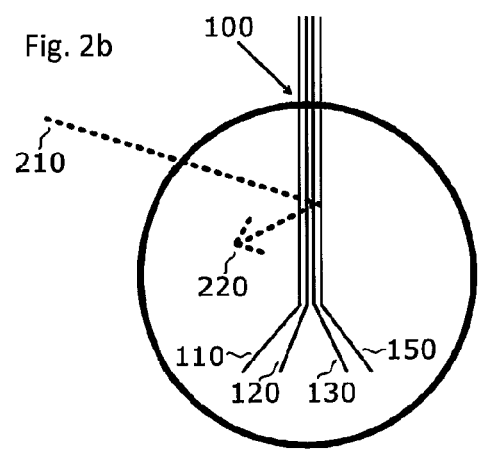
FIG. 2b shows a separated detail view of a typical embodiment of a screen according to the invention.

The embodiment of the apparatus according to the invention shown in FIG. 2b is a screen 100 comprising 3 layers, wherein the first layer, is a front reflecting screen 110 having an area mass in the range 5-40 g/m$^2$, preferably 20 g/m$^2$. This layer is not perforated, preferably woven, yet the area mass allows sound through by virtue of the low mass and the open weave. The high density provides a sharp image; however the intensity of the reflected light is low.

The screen 100 further comprises a second reflecting screen 120 having an area mass in the range 10-80 g/m$^2$, preferably 40 g/m$^2$. This layer is knitted, thus allowing sound through by virtue of the perforations. The low density provides added intensity of the reflected light to the front reflecting screen. It is important to note that the separation between the front reflecting screen 110 and the second reflecting screen 120 should be kept small to avoid the images on the two screens to be perceptibly shifted from the viewing position of the audience. The tolerance is therefore strongly dependent on the actual geometry of positions of the projector, the audience and the pixel size. For simplicity it is preferred that these two layers are glued together.

The screen 100 further comprises a third reflecting screen 130 having an area mass in the range 50-200 g/m$^2$, more preferably 50-100 g/m$^2$. This layer is either woven or knitted, thus allowing sound through by virtue of the perforations. The high area mass provides added stability to the screen and improvement in intensity of the reflected light to the front reflecting screen. The structure allows more tolerance with respect to the separation between the second reflecting screen 120 and the third reflecting screen but should be kept small enough to avoid the pixels bleeding from the viewing position of the audience. For simplicity it is preferred that the first two layers 110 and 120 are attached to the third layer 130 by tensioning.

Figure 3:
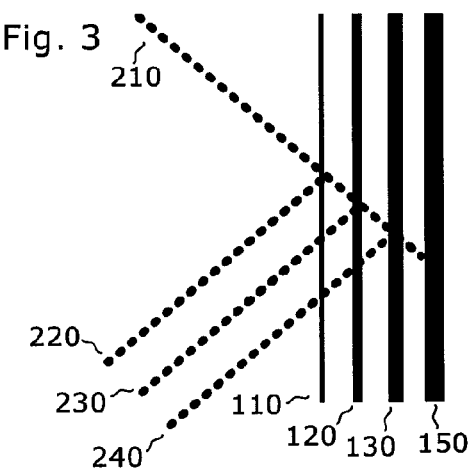
FIG. 3 shows a view of reflections from a typical embodiment of a screen according to the invention.

The light beam from 210 the projector will result in a reflected beam 220 from the front reflecting screen, a reflected beam 230 from the second reflecting screen, and a reflected beam 240 from the third reflecting screen. These reflections add to the intensity experienced by the audience. To maintain high contrast the reflected beams should be close together so to minimizing reflected lights from a first pixel from the second reflecting screen overlapping a reflected lights from a second pixel from the front reflecting screen. This is illustrated in FIG. 3.

It should be noted that a black backing screen is not required.

Alternative Embodiments

A number of variations on the above can be envisaged. For instance the screen could comprise just the front reflecting woven screen bonded to a second reflecting knitted screen bonded together.

It is also possible to have the first and second screens glued together with subsequent screens attached only mechanically together. This has the advantage of easier handling for transport and rigging.

INDUSTRIAL APPLICABILITY

The invention according to the application finds use in screen projections at high resolution, wherein the individual pixel size has a size comparable to the feature sizes in the texture of screens in prior art, while at the same time allowing sounds from a loudspeaker system to reach an audience on the opposite side of the screen from the loudspeakers.

The invention claimed is:

1. A projection screen (100) that allows sound to pass through the screen, comprising:
    a first non-perforated reflecting screen (110) of a first density, and
    at least one perforated reflecting screen (120, 130) of a second density,
    wherein the first non-perforated reflecting screen (110) is positioned in front of the at least one perforated reflecting screen (120, 130) relative to a light beam (210) from a projector (200),
    wherein the first density in g/m2 is greater than the second density in g/m2,
    and the perforated reflecting screen is knitted.

2. The projection screen according to claim 1, wherein the first non-perforated reflecting screen is a weaved fabric.

3. The projection screen according to claim 2, wherein the first non-perforated reflecting screen density is in the range of approximately 5-40 g/m$^2$.

4. The projection screen according to claim 3, wherein the first non-perforated reflecting screen density is approximately 20 g/m$^2$.

5. The projection screen according to claim 4, wherein the at least one perforated reflecting screen (120, 130) is a knitted fabric.

6. The projection screen according to claim 3, wherein the at least one perforated reflecting screen (120, 130) is a knitted fabric.

7. The projection screen according to claim 2, wherein the at least one perforated reflecting screen (120, 130) is a knitted fabric.

8. The projection screen according to claim 1, wherein the first non-perforated reflecting screen density is in the range of approximately 5-40 g/m$^2$.

9. The projection screen according to claim 8, wherein the first non-perforated reflecting screen density is approximately 20 g/m$^2$.

10. The projection screen according to claim 9, wherein the at least one perforated reflecting screen (120, 130) is a knitted fabric.

11. The projection screen according to claim 8, wherein the at least one perforated reflecting screen (120, 130) is a knitted fabric.

12. The projection screen according to claim 1, wherein the at least one perforated reflecting screen (120, 130) comprises a second reflecting screen (120), wherein the density is in the range of approximately 10-80 g/m$^2$.

13. The projection screen according to claim 12, wherein the second reflecting screen density is approximately 40 g/m$^2$.

14. The projection screen according to claim 13, wherein the at least one perforated reflecting screen (120, 130) is a knitted fabric.

15. The projection screen according to claim 12, wherein the at least one perforated reflecting screen (120, 130) is a knitted fabric.

16. The projection screen according to claim 1, wherein the perforated reflecting screen (120, 130) comprises a second perforated reflecting screen (120), wherein the density is in the range of approximately 150-200 g/m$^2$.

17. The projection screen according to claim 16, wherein the at least one perforated reflecting screen (120, 130) is a knitted fabric.

18. The projection screen according to claim 1, wherein the at least one perforated reflecting screen (120, 130) is a knitted fabric.

* * * * *